United States Patent
Scharfenkamp

(10) Patent No.: US 11,717,078 B2
(45) Date of Patent: Aug. 8, 2023

(54) TABLE LEG ASSEMBLY

(71) Applicant: Smith System Manufacturing Company, Carrollton, TX (US)

(72) Inventor: Robert Joseph Scharfenkamp, Prosper, TX (US)

(73) Assignee: Smith System Manufacturing Company, Carrollton, TX (US)

( * ) Notice: Subject to any disclaimer, the term of this patent is extended or adjusted under 35 U.S.C. 154(b) by 0 days.

(21) Appl. No.: 17/651,876

(22) Filed: Feb. 21, 2022

(65) Prior Publication Data

US 2023/0180927 A1 Jun. 15, 2023

Related U.S. Application Data

(60) Provisional application No. 63/265,395, filed on Dec. 14, 2021.

(51) Int. Cl.
*A47B 9/14* (2006.01)
*F16B 7/10* (2006.01)

(52) U.S. Cl.
CPC ............... *A47B 9/14* (2013.01); *F16B 7/105* (2013.01)

(58) Field of Classification Search
CPC .................................. A47B 9/14; F16B 7/105
See application file for complete search history.

(56) References Cited

U.S. PATENT DOCUMENTS

| | | | |
|---|---|---|---|
| 2,952,484 A | 9/1960 | Zoltok | |
| 3,074,589 A | 1/1963 | Chaney | |
| 3,164,351 A * | 1/1965 | Rembowski | A47B 9/14 248/188.5 |
| 3,854,831 A | 12/1974 | Gutner | |
| 3,855,946 A * | 12/1974 | Bales | A47B 9/14 403/379.3 |
| 4,080,080 A | 3/1978 | Cisler | |
| 4,249,830 A | 2/1981 | Day | |
| 4,440,518 A | 4/1984 | Davlantes | |
| 5,413,608 A | 5/1995 | Keller | |
| 5,513,825 A | 5/1996 | Gutgsell | |
| 5,562,052 A | 10/1996 | Glashouwer et al. | |

(Continued)

FOREIGN PATENT DOCUMENTS

| | | |
|---|---|---|
| DE | 19639691 C1 | 10/1997 |
| DE | 10030918 A1 | 1/2002 |

(Continued)

*Primary Examiner* — Daniel J Rohrhoff
(74) *Attorney, Agent, or Firm* — Price Heneveld LLP

(57) ABSTRACT

A table assembly includes a worksurface and at least one leg assembly coupled to the worksurface and configured to support the worksurface above a floor surface, the at least one leg assembly including a first leg member having an aperture located along a length of the first leg member, the aperture having a first diameter, a second leg member telescoping received within the first leg member and having a threaded bore located along a length of the second leg member, the bore having a second diameter that is larger than the first diameter, and an engagement member having a first portion threadably received within the bore of the second leg member and a second portion configured to be selectively received within the aperture of the first leg member thereby telescopingly fixing the second leg member with respect to the first leg member.

20 Claims, 12 Drawing Sheets

(56) References Cited

U.S. PATENT DOCUMENTS

| | | |
|---|---|---|
| 5,672,957 A | 7/1997 | Lange |
| 5,918,553 A | 7/1999 | Hellwig et al. |
| 6,092,771 A * | 7/2000 | Fich .................. A47B 9/06 |
| | | 248/407 |
| 6,168,630 B1 | 1/2001 | Keller et al. |
| 6,409,768 B1 * | 6/2002 | Tepic ................ A61B 17/1753 |
| | | 623/23.27 |
| 6,435,112 B1 | 8/2002 | Insalaco |
| 7,217,057 B2 * | 5/2007 | Keller .................... A61B 17/88 |
| | | 606/62 |
| 7,938,593 B1 | 5/2011 | Young |
| 8,333,531 B1 | 12/2012 | Wei et al. |
| 8,485,751 B2 | 7/2013 | Vetesnik |
| 8,490,555 B1 | 7/2013 | Agee |
| 9,366,022 B2 | 6/2016 | Frey |
| 10,082,167 B2 | 9/2018 | Peverada |
| 10,393,166 B2 * | 8/2019 | Kito ..................... F16J 15/3464 |
| 2004/0261221 A1 * | 12/2004 | Dumont .................. F16B 7/105 |
| | | 16/110.1 |
| 2006/0140714 A1 | 6/2006 | Wang |
| 2019/0301167 A1 * | 10/2019 | Tsukamoto ......... E04H 12/2253 |
| 2021/0289937 A1 * | 9/2021 | Scharfenkamp ......... A47B 9/14 |

FOREIGN PATENT DOCUMENTS

| | | |
|---|---|---|
| DE | 20116625 U1 | 12/2004 |
| DE | 102005007363 A1 | 9/2006 |
| DK | 2080447 T3 | 5/2012 |
| DK | 3311695 T3 | 9/2019 |
| JP | 10313951 A | 12/1998 |
| JP | 2002017454 A | 1/2002 |
| JP | 4399291 B2 | 1/2010 |
| JP | 4651828 B2 | 3/2011 |
| JP | 5404302 B2 | 1/2014 |
| JP | 2015006251 A | 1/2015 |
| JP | 2021112581 A | 8/2021 |
| KR | 200365379 Y1 | 10/2004 |
| SE | 453907 B | 3/1988 |

* cited by examiner

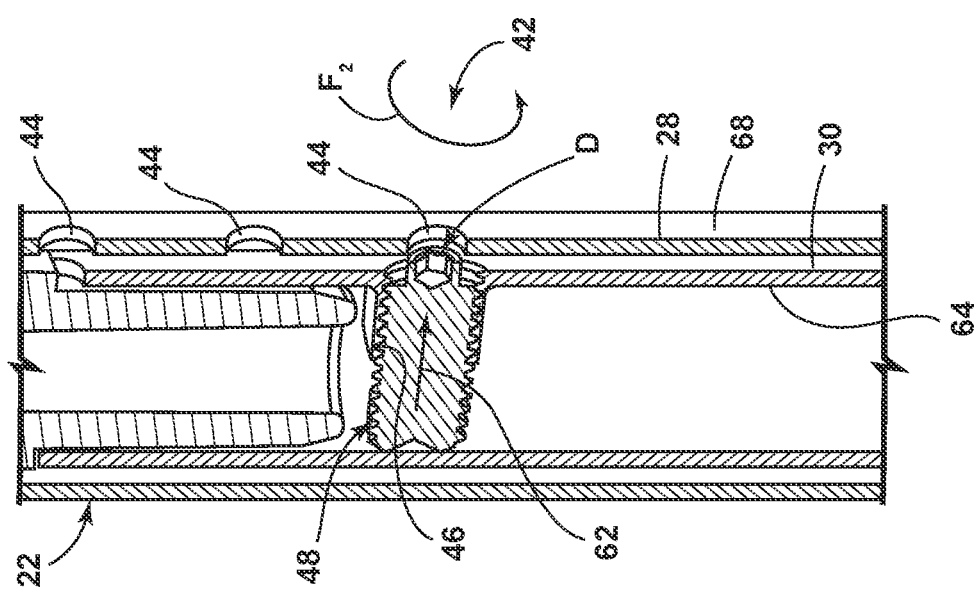
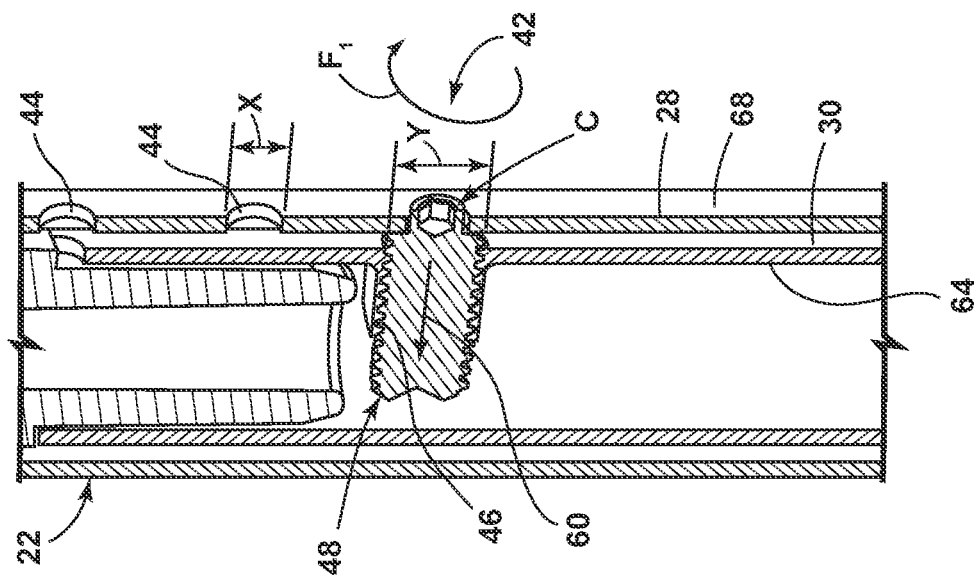
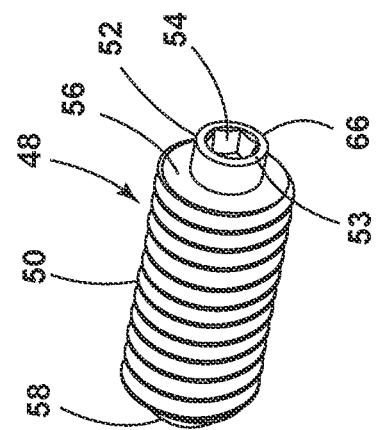
FIG. 2A
FIG. 2B
FIG. 3

TABLE LEG ASSEMBLY

CROSS-REFERENCE OF RELATED APPLICATION

This application claims benefit of U.S. Provisional Patent Application No. 63/265,395, filed on Dec. 14, 2021, entitled "TABLE LEG ASSEMBLY," the entire disclosure of which is incorporated herein by reference.

BACKGROUND OF THE INVENTION

The furniture arrangement as disclosed herein relates to a height-adjustable table/desk assembly, and specifically to a table/desk assembly that includes selectively adjustable leg assemblies.

SUMMARY OF THE INVENTION

In one embodiment, a table/desk assembly as shown and described herein may include a worksurface, and at least one leg assembly coupled to the worksurface and configured to support the worksurface above a floor surface. The at least one leg assembly includes a first leg member that may have a plurality of apertures located along a length of the first leg member, each of the apertures of the plurality of apertures having a first diameter, a second leg member telescoping received within the first leg member and having a threaded bore located along a length of the second leg member, the bore having a second diameter that is larger than the first diameter, and a set screw having a first portion threadably received within the bore of the second leg member and a second portion including a tool-receiving aperture, where the set screw is configured to move between a first position where the first portion is located within the bore of the second leg member and the second portion is received within one of the apertures of the plurality of apertures of the first leg member, thereby fixing the second leg member with respect to the first leg member, and a second position where the first portion is located within the bore of the second leg member and the second portion is withdrawn from the aperture of the plurality of apertures of the first leg member, thereby allowing the second leg member to be longitudinally adjusted with respect to the first leg member.

In another embodiment, the table assembly may alternatively or in addition include a worksurface, and at least one leg assembly coupled to the worksurface and configured to support the worksurface above a floor surface. The at least one leg assembly includes a first leg member having an aperture located along a length of the first leg member, the aperture having a first diameter, second leg member telescoping received within the first leg member and having a threaded bore located along a length of the second leg member, the bore having a second diameter that is larger than the first diameter, and an engagement member having a first portion threadably received within the bore of the second leg member and a second portion configured to be received within the aperture of the first leg member thereby telescopingly fixing the second leg member with respect to the first leg member.

In yet another embodiment, a method for adjusting a height of a table assembly may include providing a worksurface, providing at least one leg assembly coupled to the worksurface and configured to support the worksurface above a floor surface, the at least one leg assembly including a first leg member having a first aperture and a spaced-apart second aperture each located along a length of the first leg member and each having an aperture having a first width, a second leg member telescoping received within the first leg member, the second leg member having a recess having a second width, and an engagement member having a first portion configured to positively engage the recess of the second leg member and a second portion configured to be received within the aperture of the first leg member. The method may further include applying a first force to the engagement member to move the engagement member from a first position where the first portion positively engages the recess and the second portion is received within the first aperture, to a second position where the first portion positively engages the recess and the second portion is withdrawn from the first aperture, the engagement member remaining in the second position when the first force is removed from the engagement member and the recess is aligned with the first aperture, telescopingly adjusting the second leg member with respect to the first leg member, and applying a second force to the engagement member to move the engagement member from the second position to a third position where the first portion positively engages the recess and the second portion is received within the second aperture, thereby telescopingly locking the first leg member with respect to the second leg member.

These and other features, advantages, and objects of the present invention will be further understood and appreciated by those skilled in the art by reference to the following specification, claims, and appended drawings.

BRIEF DESCRIPTION OF THE DRAWINGS

FIG. 2A is a cross-sectional front elevation view of one of the leg assemblies taken in the area IIA, FIG. 1, with a set screw shown in an engaged or first position;

FIG. 2B is a cross-sectional front elevation view of the leg assembly of FIG. 2A with the set screw shown in a disengaged or second position;

FIG. 3 is a perspective view of the set screw;

DETAILED DESCRIPTION

Figure 1:
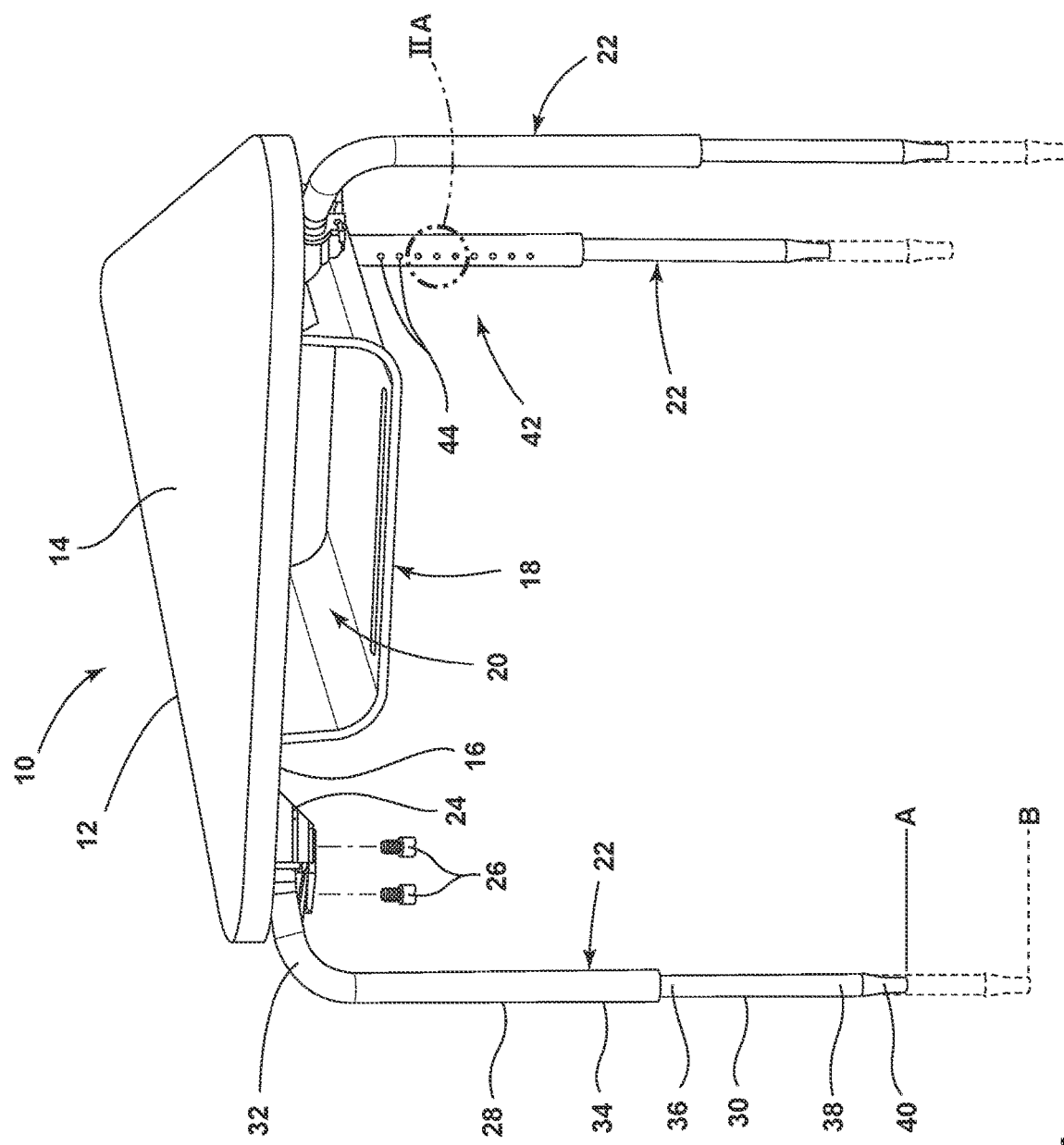
FIG. 1 is a perspective view of a height-adjustable table assembly with a plurality of leg assemblies each shown in a relatively retracted first position in solid line and a relatively extended second position in dashed line.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

A table assembly 10 (FIG. 1) includes a worksurface or table top 12 having a top surface 14 and a bottom surface 16, a storage member 18 secured to the bottom surface 16 of the worksurface 12 and defining an interior storage space 20, and a plurality of leg assemblies 22 each coupled to the bottom surface 16 of the worksurface 12 by a plurality of corresponding mounting brackets 24 where a plurality of mechanical fasteners such as bolts 26 secure the leg assemblies 22 to the mounting brackets 24. Although a triangularly-shaped worksurface 12 is illustrated, worksurfaces of other configurations may also be utilized. It is also noted that each leg assembly 22 may be secured to the associated worksurface 12 by mounting brackets or coupling arrangements in various manners as known in the art.

As best illustrated in FIG. 1, the overall length of each leg assembly 22 is adjustable between a plurality of lengths, including a retracted length A, and an extended length B, thereby supporting the worksurface 12 above a supporting floor surface at various selected heights.

Each leg assembly 22 (FIGS. 1-2B) includes an upper leg member 28 and a lower leg member 30 telescopingly received within a passageway 31 of the upper leg member 28. Specifically, each upper leg member 28 includes an upper end 32 secured to one of the corresponding mounting brackets 24 via mechanical fasteners 26, and a lower end 34 that telescopingly receives the lower leg member 30 therein. Each lower leg member 30 includes an upper end 36 telescopingly received within an aperture 37 that opens into the passageway 31 of the upper leg member 28, and a lower end 38 to which a foot member 40 may be attached where the foot member 40 is configured to abut the supporting floor surface. Although in the illustrated example the upper leg member 28 and the lower leg member 30 each have a circular cross-sectional configuration, other configurations for the leg members 28, 30 may be utilized.

Each leg assembly 22 further includes a length adjustment arrangement 42 configured to allow a user to adjust the length of each of the leg assemblies 22 between various selected positions, including, among other heights, the retracted position A and the extended position B. In the illustrated example, each leg adjustment arrangement 42 includes a plurality of apertures 44 (FIGS. 1 and 2A) spaced along the length of the upper leg member 28, where each of the apertures 44 have a diameter X. Each leg adjustment arrangement 42 further includes a threaded bore 46 spaced along a length of and extending into a side surface of the lower leg member 30 and having a diameter Y that is greater than the diameter X, and a set screw 48 threadably received within the threaded bore 46. In various embodiments, the threaded bore 46 includes flange portion 49 that extends into a passageway 51 of the lower leg member 30. The flange portion 49 further defines a portion of the threading bore 46 through which the set screw 48 may travel through when adjusting the set screw 48 to utilize the leg adjustment arrangement 42.

In the illustrated example, the set screw 48 (FIG. 3) includes a threaded first portion 50 configured to be threadably received within the threaded bore 46, and a second portion 52 configured to be received within one of the selected apertures 44, as described below. The second portion 52 includes a tool-receiving aperture 54 in an end surface 53 thereof where the tool-receiving aperture is configured to receive an adjustment tool, such as an Allen wrench, as described below. The first portion 50 further includes a radially-extending shoulder 56 at a first end, and a tapered portion 58 located opposite the shoulder 56. In the illustrated example, the diameter of the second portion 52 is sized to be received within the apertures 44 of the upper leg member 28 and is less than the diameter of the first portion 50 which is configured to be threadably received within the threading channel of the threaded bore 48 of the lower leg member 30.

Figure 4:
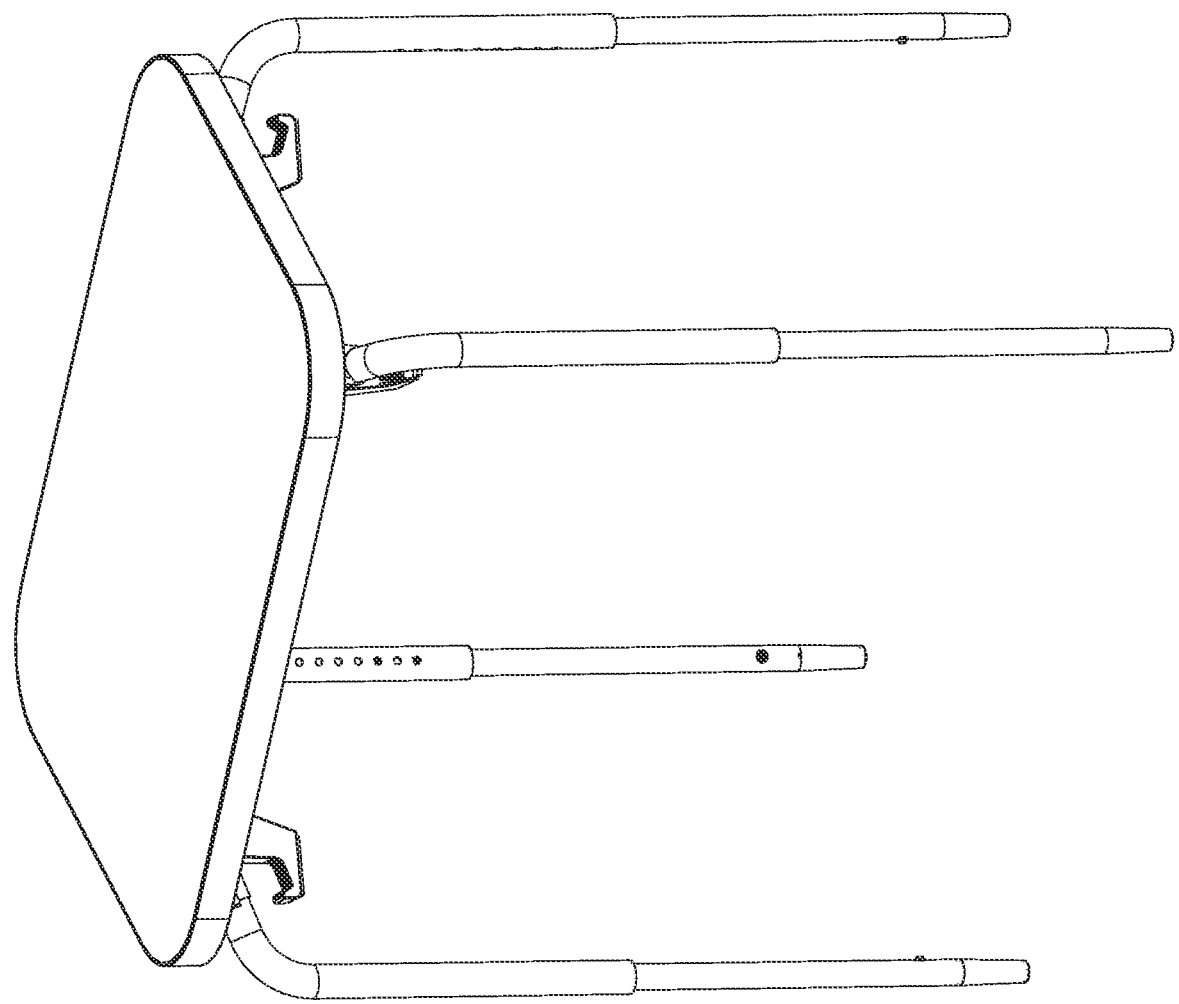
FIGS. 4-8 are views of a first alternative embodiment of the height-adjustable table assembly.
Figure 5:
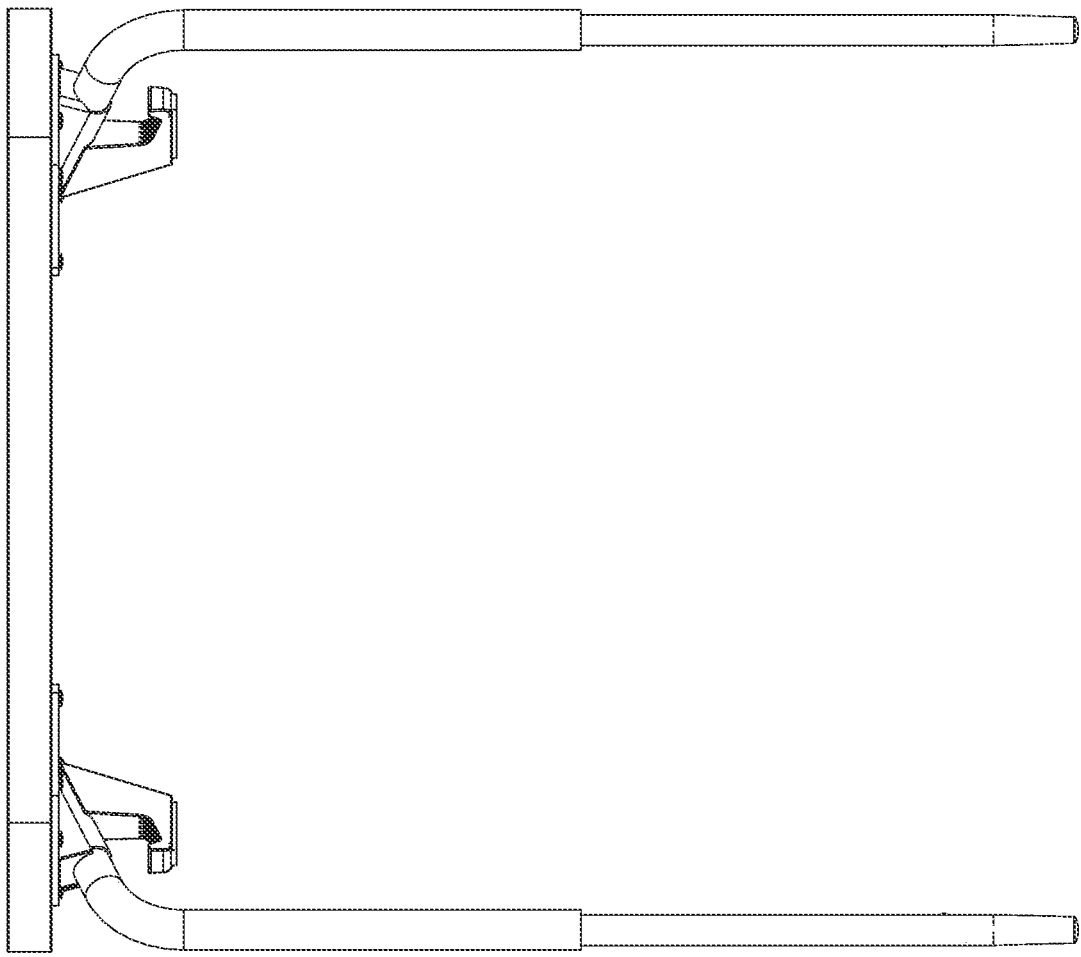
Figure 6:
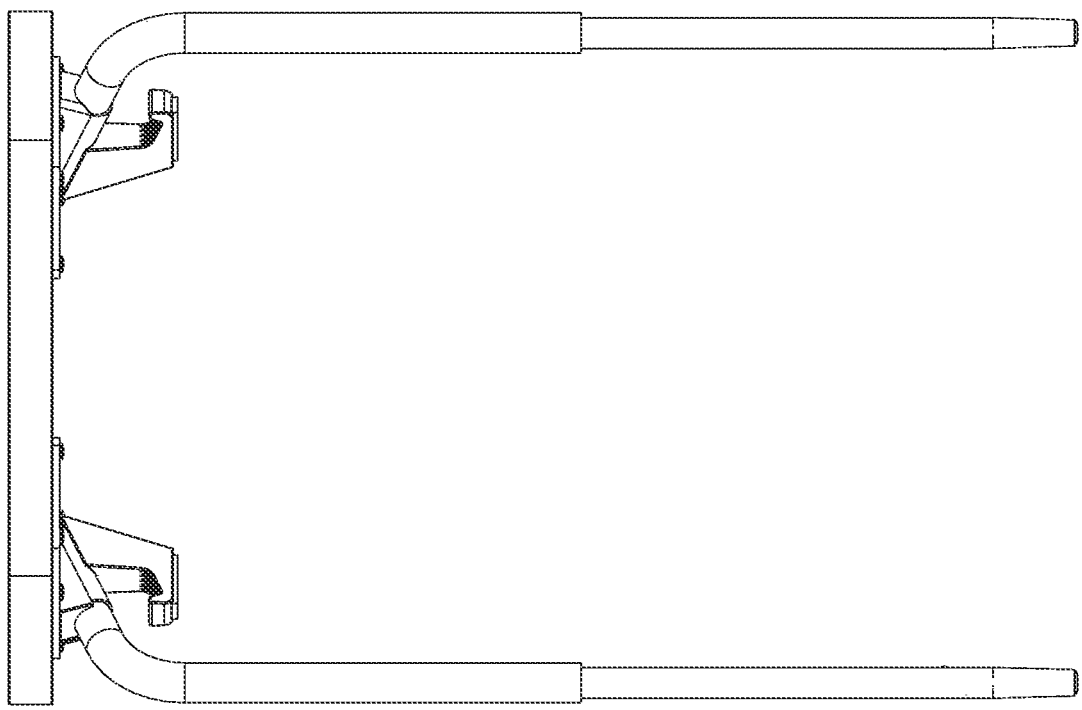
Figure 7:
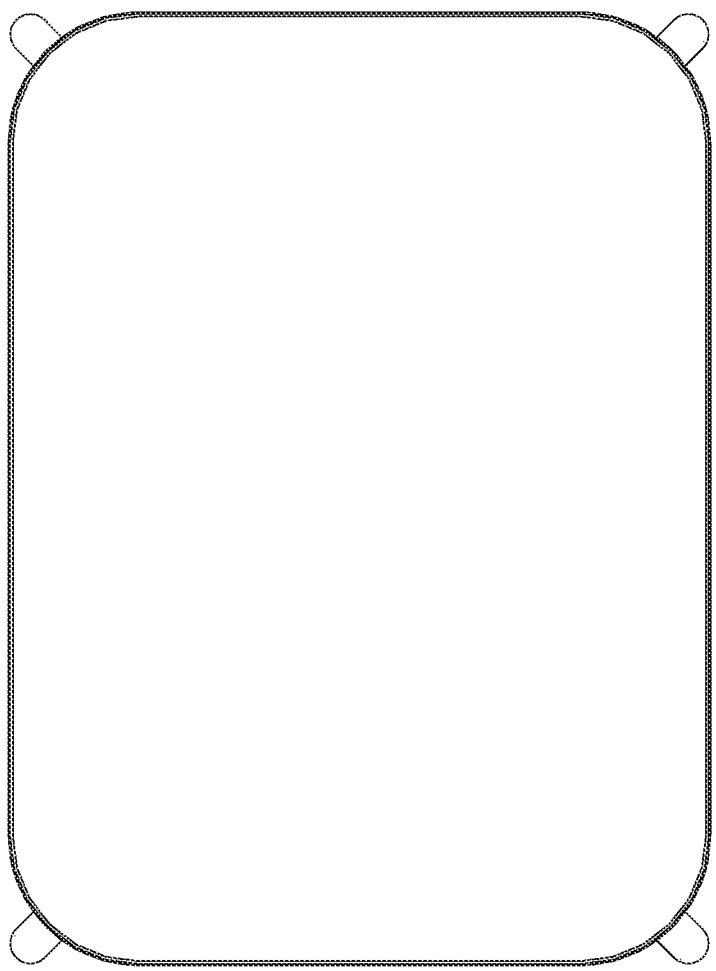
Figure 8:
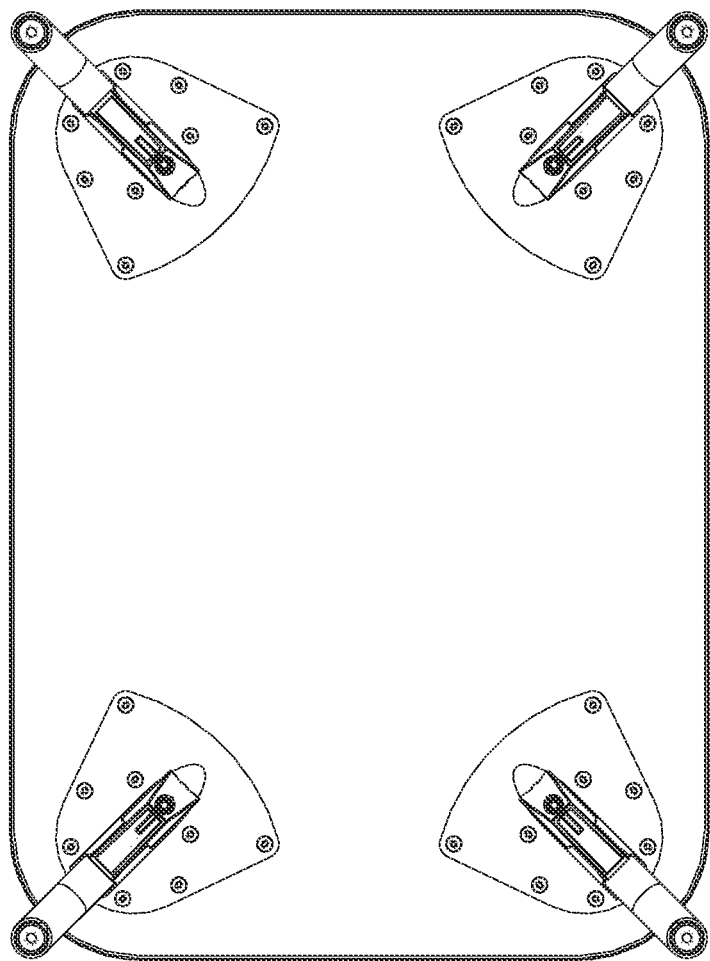
Figure 9:
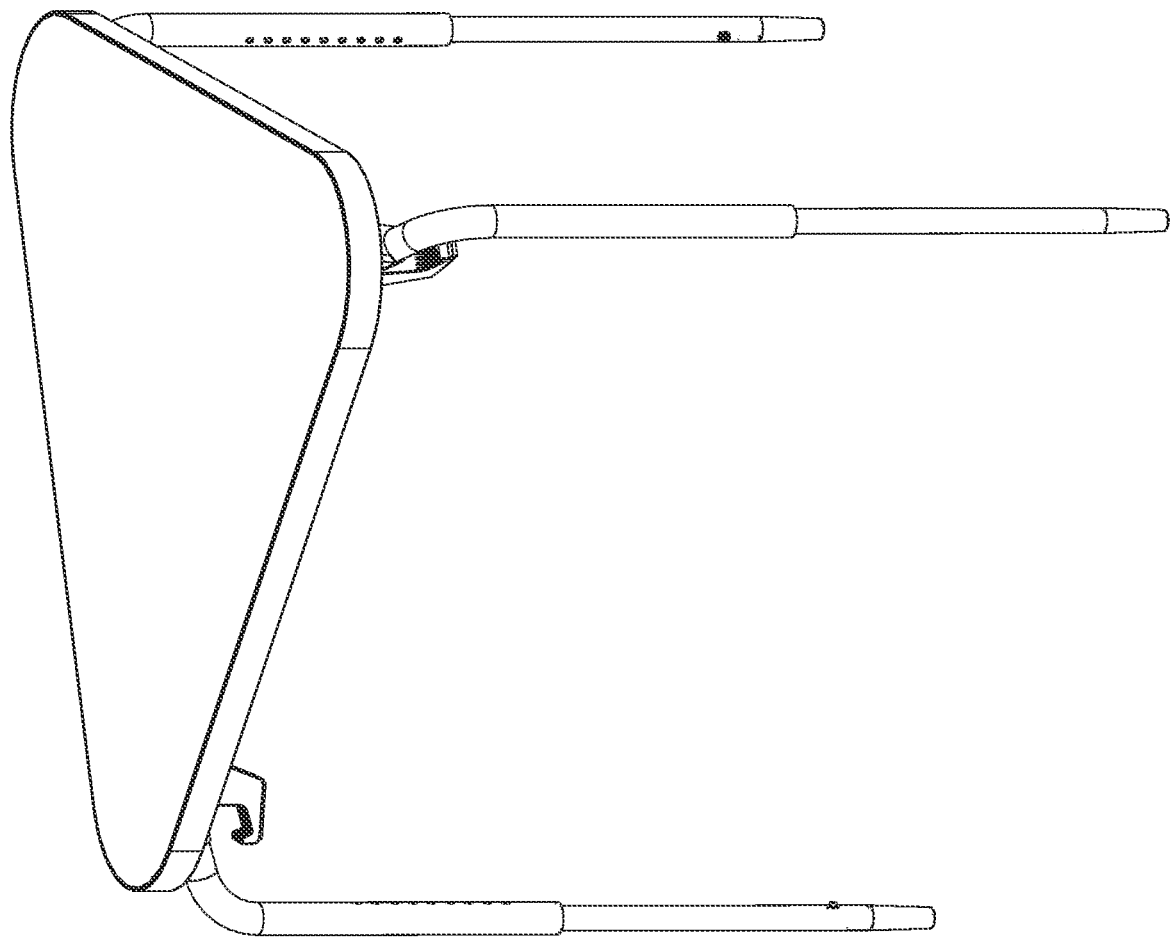
FIGS. 9-13 are views of a second alternative embodiment of the height-adjustable table assembly.
Figure 10:
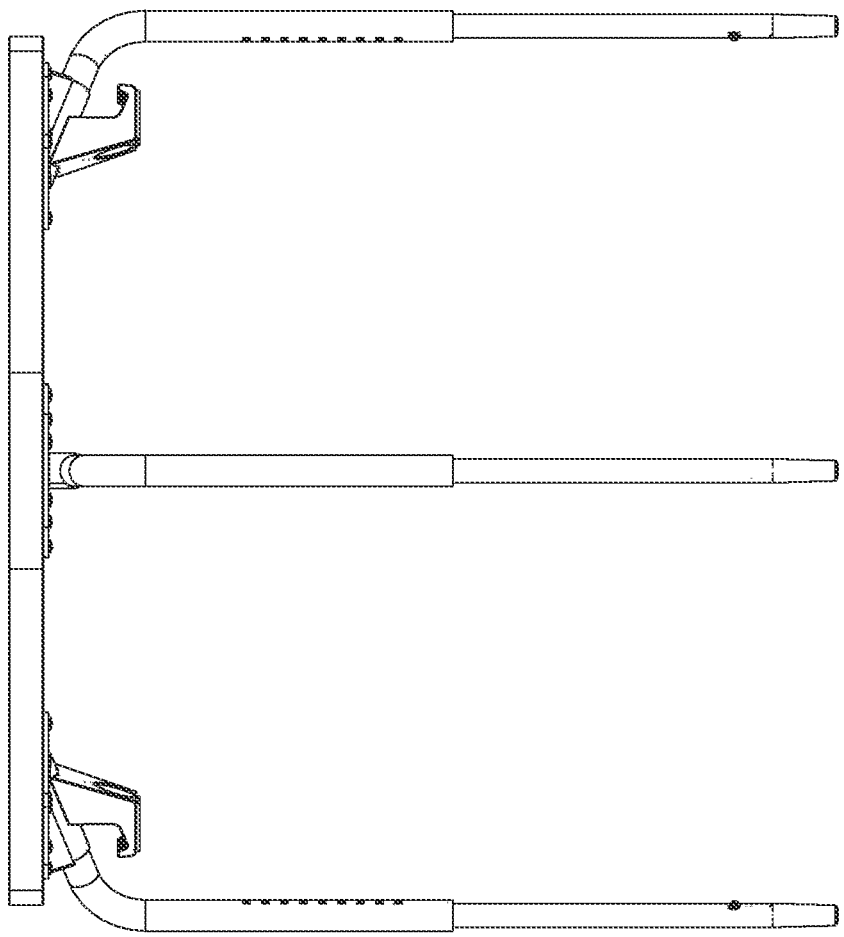
Figure 11:
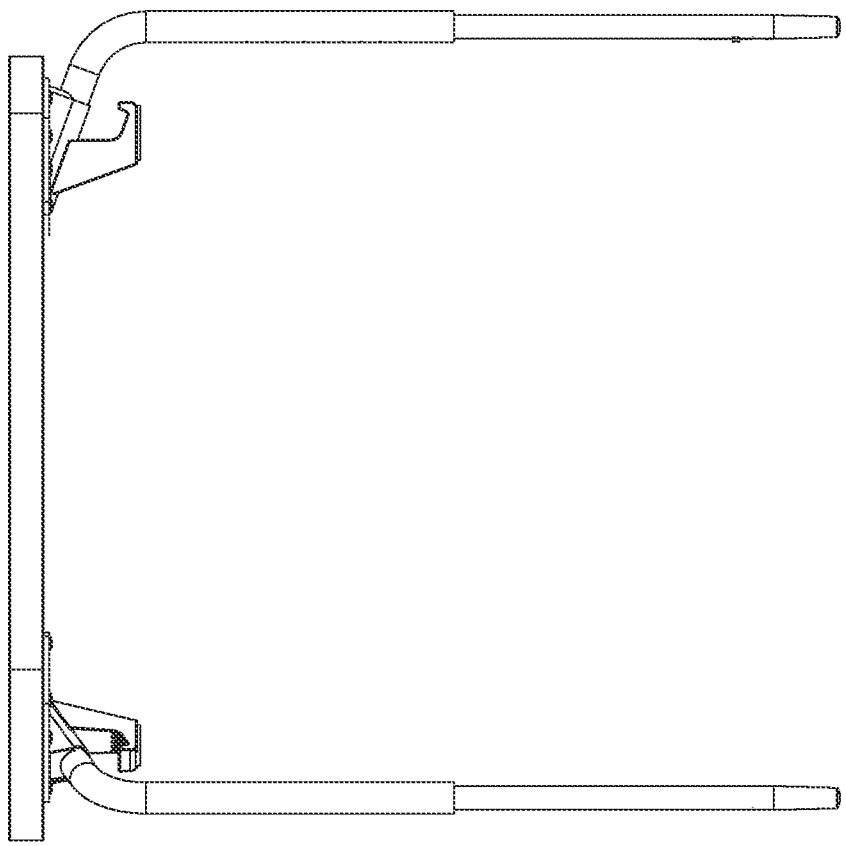
Figure 12:
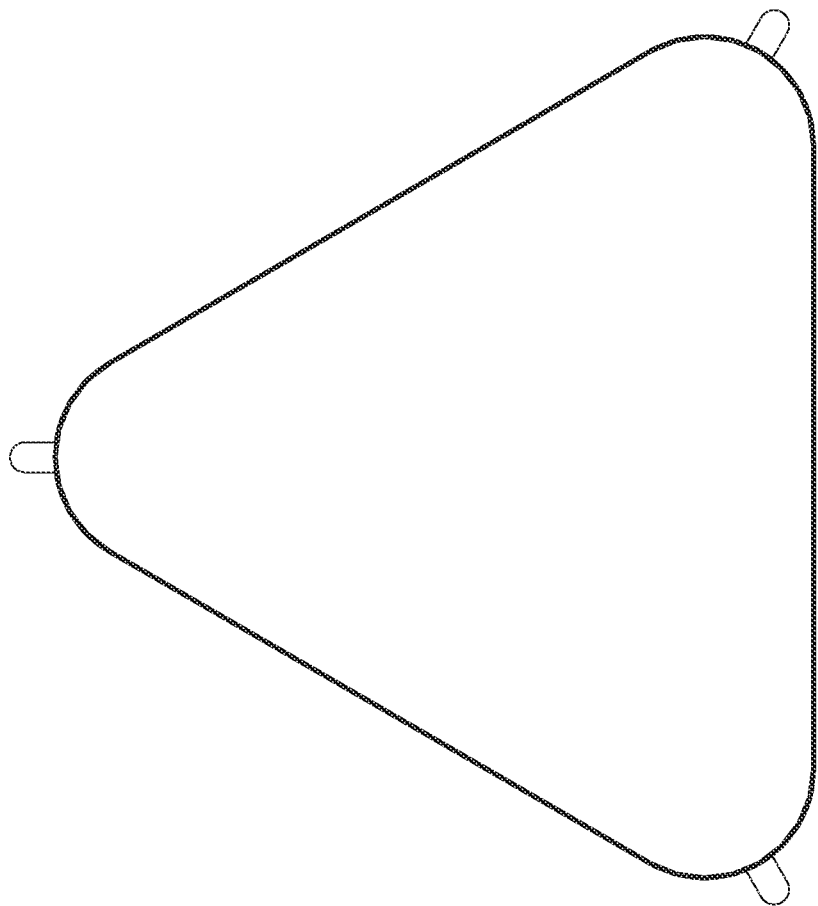
Figure 13:
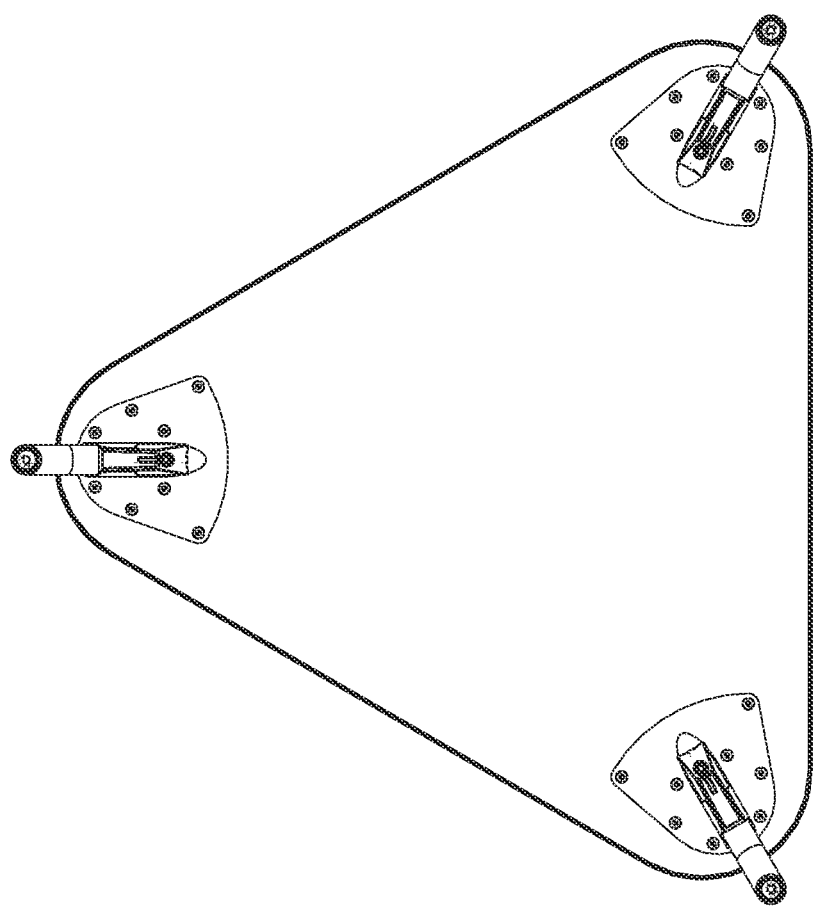

FIGS. 4-8 depict an alternative embodiment of the height-adjustable table assembly, including FIG. 4 showing a perspective view, FIG. 5 showing a front elevation view (the rear elevation view being a mirror image thereof), FIG. 6 showing a side elevation view (the opposite side elevation view being a mirror image thereof), FIG. 7 showing a top plan view, and FIG. 8 showing a bottom plan view. FIGS. 9-13 depict another alternative embodiment of FIGS. 9-13 depict an alternative embodiment of the height-adjustable table assembly, including FIG. 9 showing a perspective view, FIG. 10 showing a front elevation view (the rear elevation view being a mirror image thereof), FIG. 11 showing a side elevation view (the opposite side elevation view being a mirror image thereof), FIG. 12 showing a top plan view, and FIG. 13 showing a bottom plan view.

In assembly and operation, the overall height of the table and the relative height of the worksurface 12 above the supporting floor surface may be adjusted by adjusting the length of each of the leg assemblies 22. Specifically, the set screw 48 of each leg assembly 22 may be adjusted between a locked or engaged position C (FIG. 2A) where the second portion 52 of the set screw 48 is received within and engages an aperture wall 59 defining one of the apertures 44 of the outer leg member 28, thereby preventing the lower leg member 30 from being telescopingly adjusted with respect to the upper leg member 28, and an unlocked or disengaged position D (FIG. 2B) where the second portion 52 of the set screw 48 is withdrawn from and does not engage an aperture wall 59 defining any the apertures 44 of the upper leg member 28, thereby allowing the lower leg member 30 to be telescopingly adjusted with respect to the upper leg member 28.

In operation, a force $F_1$ may be applied to the set screw 50 via an Allen wrench (or other tool) engaging the tool receiving aperture 54, thereby moving the set screw 48 in a direction 60, until the second portion 52 of the set screw 48 is withdrawn from and does not engage any of the aperture walls 59 defining the apertures 44 of the outer leg member 28. The lower leg member 30 may then be telescopingly adjusted with respect to the upper leg member 28 to a position where the second portion 52 of the set screw 48 is aligned with another aperture 44 of the outer leg member 28. The tool, such as an Allen wrench, may then be utilized to apply a force $F_2$ to the set screw 48, thereby moving the set screw 48 in a direction 62 from the disengaged position C (FIG. 2B) to the engaged position D (FIG. 2A) where the second portion 52 of the set screw 48 is received within one of the apertures 44 of the outer leg member 28, thereby preventing the lower leg member 30 from telescoping with respect to the outer leg member 28. In the illustrated example, the shoulder 56 of the set screw 48 may abut an inner surface or wall 64 of the lower leg member 30, thereby resisting movement of the set screw 48 from the engaged position C to the disengaged position D. It is also noted that an outer surface 66 of the set screw 48 is flush with or slightly recessed with respect to an outer surface or wall 68 of the outer leg member 28, thereby reducing the potential hazard of the set screw 48 catching on clothing, personal articles, and the like of a user. Accordingly, the leg adjustment arrangement 42 may be contained within, or at least be flush within the surface of, the leg assembly 22 and provide minimal visual or physical disruption to the leg assembly 22.

In the foregoing description, it will be readily appreciated by those skilled in the art that modifications may be made to the disclosed embodiments without departing from the concepts disclosed herein. Such modifications are considered to be included in the following claims, unless these claims by their language expressly state otherwise.

The invention claimed is:

1. A table assembly, comprising:
a worksurface; and
at least one leg assembly coupled to the worksurface and configured to support the worksurface above a floor surface, the at least one leg assembly comprising:
a first leg member having a plurality of apertures located along a length of the first leg member, each of the apertures of the plurality of apertures having a first diameter;
a second leg member telescoping received within the first leg member and having a threaded bore located along a length of the second leg member, the bore having a second diameter that is larger than the first diameter; and
a set screw having a first portion threadably received within the bore of the second leg member and a second portion including a tool-receiving aperture, where the set screw is configured to move between a first position where the first portion is located within the bore of the second leg member and the second portion is received within one of the apertures of the plurality of apertures of the first leg member, thereby fixing the second leg member with respect to the first leg member, and a second position where the first portion is located within the bore of the second leg member and the second portion is withdrawn from the aperture of the plurality of apertures of the first leg member, thereby allowing the second leg member to be longitudinally adjusted with respect to the first leg member.

2. The table assembly of claim 1, wherein the tool-receiving aperture is configured to receive an Allen wrench.

3. The table assembly of claim 1, wherein the first leg member has a first end coupled to the worksurface and a second end that telescoping receives the second leg member.

4. The table assembly of claim 1, wherein the set screw includes a tapered end portion.

5. The table assembly of claim 1, wherein the at least one leg assembly includes a plurality of leg assemblies.

6. The table assembly of claim 1, wherein the set screw is configured to abut an inner wall of the first leg member when the set screw is in the first position.

7. A table assembly, comprising:
a worksurface; and
at least one leg assembly coupled to the worksurface and configured to support the worksurface above a floor surface, the at least one leg assembly comprising:
a first leg member having an aperture located along a length of the first leg member, the aperture having a first diameter;
a second leg member telescoping received within the first leg member and having a threaded bore located along a length of the second leg member, the bore having a second diameter that is larger than the first diameter; and
an engagement member having a first portion threadably received within the bore of the second leg member and a second portion configured to be received within the aperture of the first leg member thereby telescopingly fixing the second leg member with respect to the first leg member.

8. The table assembly of claim 7, wherein the engagement member comprises a set screw.

9. The table assembly of claim 7, wherein the second portion of the engagement member includes a tool-receiving aperture.

10. The table assembly of claim 9, wherein the tool-receiving aperture is configured to receive an Allen wrench.

11. The table assembly of claim 7, wherein the engagement member is configured to move between a first position where the first portion is located within the bore and the second portion is received within the aperture and a second position where the first portion is located within the bore and the second portion is withdrawn from the aperture.

12. The table assembly of claim 11, wherein the engagement member is configured to abut an inner wall of the first leg member when the engagement member is in the first position.

13. The table assembly of claim 7, wherein the first leg member has a first end coupled to the worksurface and a second end that telescoping receives the second leg member.

14. The table assembly of claim 7, wherein the aperture is one of a plurality of apertures longitudinally spaced along the length of the first leg member.

15. The table assembly of claim 7, wherein the engagement member includes a tapered end portion.

16. A method for adjusting a height of a table assembly, comprising:
providing a worksurface;
providing at least one leg assembly coupled to the worksurface and configured to support the worksurface above a floor surface, the at least one leg assembly including a first leg member having a first aperture and a spaced-apart second aperture each located along a length of the first leg member and each having an aperture having a first width, a second leg member telescoping received within the first leg member, the second leg member having a recess having a second width, and an engagement member having a first portion configured to positively engage the recess of the second leg member and a second portion configured to be received within the aperture of the first leg member;
applying a first force to the engagement member to move the engagement member from a first position where the first portion positively engages the recess and the second portion is received within the first aperture, to a second position where the first portion positively engages the recess and the second portion is withdrawn from the first aperture, the engagement member remaining in the second position when the first force is removed from the engagement member and the recess is aligned with the first aperture;
telescopingly adjusting the second leg member with respect to the first leg member; and
applying a second force to the engagement member to move the engagement member from the second position to a third position where the first portion positively engages the recess and the second portion is received within the second aperture, thereby telescopingly locking the first leg member with respect to the second leg member.

17. The method of claim 16, wherein the first force and the second force are each rotational forces.

18. The method of claim 16, where the first width is greater than the second width.

19. The method of claim 18, wherein the recess is a threaded bore.

20. The method of claim 19, wherein the engagement member includes a set screw having a tool-receiving relief.

\* \* \* \* \*

UNITED STATES PATENT AND TRADEMARK OFFICE
CERTIFICATE OF CORRECTION

PATENT NO. : 11,717,078 B2
APPLICATION NO. : 17/651876
DATED : August 8, 2023
INVENTOR(S) : Robert Joseph Scharfenkamp It is certified that error appears in the above-identified patent and that said Letters Patent is hereby corrected as shown below:

On the Title Page

(57) Abstract, Line 7:
"telescoping" should be – telescopingly –

In the Specification

Column 1, Line 27:
"telescoping" should be – telescopingly –

Column 1, Line 51:
After "diameter," insert -- a --

Column 1, Lines 51-52:
"telescoping" should be – telescopingly –

Column 2, Line 2:
"telescoping" should be – telescopingly –

Column 3, Line 47:
"threading" should be – threaded –

Column 4, Lines 7-8:
Delete "FIGS. 9-13 depict an alternative embodiment of" (2nd occurrence for FIGS. 9-13)

Column 4, Line 30:
After "any" insert -- of --

Signed and Sealed this
Third Day of September, 2024

Katherine Kelly Vidal
*Director of the United States Patent and Trademark Office*

In the Claims

Column 5, Claim 1, Line 14:
"telescoping" should be – telescopingly –

Column 5, Claim 3, Line 39:
"telescoping" should be – telescopingly –

Column 5, Claim 7, Line 55:
"telescoping" should be – telescopingly –

Column 6, Claim 13, Line 18:
"telescoping" should be – telescopingly –

Column 6, Claim 16, Line 34:
"telescoping" should be – telescopingly –

Column 6, Claim 18, Line 64:
"where" should be – wherein –